(12) United States Patent
Ji et al.

(10) Patent No.: US 10,125,894 B2
(45) Date of Patent: Nov. 13, 2018

(54) SYSTEM FOR PREVENTING REVERSE FLOW

(71) Applicant: Shanghai Kohler Electronics, Ltd., Shanghai (CN)

(72) Inventors: Yong Ji, Shanghai (CN); Hui Xu, Shanghai (CN)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 219 days.

(21) Appl. No.: 15/265,377

(22) Filed: Sep. 14, 2016

(65) Prior Publication Data

US 2017/0073951 A1 Mar. 16, 2017

(30) Foreign Application Priority Data

Sep. 16, 2015 (CN) .......................... 2015 1 0590715

(51) Int. Cl.
*F16K 31/34* (2006.01)
*E03C 1/10* (2006.01)
*F16K 31/26* (2006.01)

(52) U.S. Cl.
CPC ................ *F16K 31/34* (2013.01); *E03C 1/10* (2013.01); *F16K 31/26* (2013.01); *Y10T 137/7485* (2015.04)

(58) Field of Classification Search
CPC ........ F16K 31/34; F16K 31/385; F16K 21/18; F16K 31/26; E03C 1/10; E03C 1/102; E03C 1/108; Y10T 137/7368–137/7384; Y10T 137/7485; E03D 1/32; E03D 1/33; E03D 5/00; E03D 3/06; E03B 1/04

USPC ...... 137/409, 412–417, 448; 4/325, 353–419
See application file for complete search history.

(56) References Cited

U.S. PATENT DOCUMENTS 3,763,881 A * 10/1973 Jones ...................... E03D 1/32
137/414
4,977,923 A * 12/1990 Cho ........................ F16K 21/18
137/403
5,255,703 A * 10/1993 Johnson ................... E03D 1/32
137/414

(Continued)

FOREIGN PATENT DOCUMENTS

CA        2704182 A1    11/2011
CN        1504664 A      6/2004

(Continued)

*Primary Examiner* — Craig J Price
(74) *Attorney, Agent, or Firm* — Foley & Lardner LLP

(57) ABSTRACT

A backflow prevention device including a tank having a holding chamber and first and second inlets connected with the holding chamber; a control valve having an intake chamber and first and second discharge chambers connected with the first and second inlets, respectively, the intake chamber connected with the first discharge chamber through a valve inlet; a valve sealing element for opening and closing the valve inlet, the second discharge chamber connected with the intake chamber through a hole of the valve sealing element; a float in the holding chamber; a slide bar in the holding chamber, contacting the float, and moveable toward the second inlet under the action of the float; and a slide bar sealing element for controlling opening and closing of the second inlet. When the second inlet is closed, the valve inlet is closed; and when the second inlet is open, the valve inlet is opened.

20 Claims, 14 Drawing Sheets

(56) References Cited

U.S. PATENT DOCUMENTS

| | | | | |
|---|---|---|---|---|
| 5,280,803 | A * | 1/1994 | Swift | F16K 31/34 |
| | | | | 137/414 |
| 5,715,859 | A * | 2/1998 | Nichols-Roy | E03D 1/32 |
| | | | | 137/414 |
| 6,298,872 | B1 * | 10/2001 | Keller | E03C 1/052 |
| | | | | 137/360 |
| 6,332,475 | B1 * | 12/2001 | Brougham | F16K 31/34 |
| | | | | 137/244 |
| 2003/0230345 | A1 * | 12/2003 | Wey | E03D 1/32 |
| | | | | 137/414 |
| 2013/0068321 | A1 * | 3/2013 | Guthrie | F16K 31/34 |
| | | | | 137/434 |
| 2013/0228238 | A1 * | 9/2013 | Li | E03D 1/32 |
| | | | | 137/435 |
| 2014/0373934 | A1 * | 12/2014 | Jobe | F16K 31/20 |
| | | | | 137/15.26 |
| 2016/0362878 | A1 * | 12/2016 | Ji | E03C 1/10 |

FOREIGN PATENT DOCUMENTS

| | | |
|---|---|---|
| CN | 201992133 U | 9/2011 |
| CN | 103290902 A | 9/2013 |
| CN | 103362184 A | 10/2013 |

* cited by examiner

E-E

SYSTEM FOR PREVENTING REVERSE FLOW

CROSS-REFERENCE TO RELATED PATENT APPLICATIONS

This present application claims the benefit of and priority to Chinese Patent Application No. 201510590715.1, filed Sep. 16, 2015, which is incorporated herein by reference in its entirety.

BACKGROUND

The present application relates to the technical field of bathroom accessories, and in particular to a backflow prevention device and a backflow prevention system connected between drinking water and bathroom facilities.

Bathroom apparatuses (e.g. a toilet) are typically connected to a drinking water system for water supply, which may result in a potential polluting water downstream, and the water in a bathroom apparatus goes against the flow, as a result of back pressure or siphonage, to the upstream drinking water system such that the upstream drinking water is polluted.

At the present, a backflow prevention device would typically be provided to avoid the occurrence of the above phenomenon and to ensure the safety of a drinking water system.

Backflow prevention devices commonly seen on the market usually use a control circuit to control water quantity so as to achieve the goal of backflow prevention. For example, a backflow prevention device connected between a bathroom facility and a drinking water system, as disclosed by Chinese Patent Application No. 201110071501.5, uses a contact pin-type or capacitance-type structure to control the water level of the backflow prevention device. As a result, the device has a complex structure and relatively poor reliability, the circuit part is in a humid environment and tends to be damaged.

The backflow prevention device for a toilet water injection valve disclosed by Chinese Patent Application No. 201080015167.5 requires that a float rotates around the axis so as to drive the plug element thereon to control an open/close hole to open or close. It further requires a special configuration of a backflow prevention part having a backflow prevention sheet, which, first, closely attaches to the groove of an action control part through the backflow prevention sheet's own recovery force, and then, tightly presses the same through back pressure, thereby cutting off the communication between the water supply pipe and the water tank. Such a configuration leads to a complex structure thereof, and requires a relatively powerful recovery force of the backflow prevention sheet. The structural configuration and operations of both the float and the backflow prevention part are relatively complex and not precise, and the running is not steady.

SUMMARY

According to an exemplary embodiment, a backflow prevention water tank is in fluid communication with an external water supply pipe. The backflow prevention water tank includes a water tank, a control valve, a control valve sealing element, a float, a slide bar, and a slide bar sealing element. The water tank has a water holding chamber, a first water inlet in fluid communication with the water-holding chamber, and a second water inlet in fluid communication with the water-holding chamber. The control valve is disposed inside the water tank and includes a water intake chamber in fluid communication with the external water supply pipe, a first water discharge chamber in fluid communication with the first water inlet, and a second water discharge chamber in fluid communication with the second water inlet, where the water intake chamber fluidly communicates with the first water discharge chamber through a control valve water inlet. The control valve sealing element is disposed inside the control valve for opening and closing the control valve water inlet, where the second water discharge chamber is disposed above the control valve sealing element so that the second water discharge chamber fluidly communicates with the water intake chamber through a sealing element through hole of the control valve sealing element. The float is disposed inside the water holding chamber. The slide bar is disposed inside the water holding chamber and is in contact with the float, where the slide bar moves toward the side of the second water inlet under the action of the float. The slide bar sealing element is disposed on the slide bar for controlling opening and closing of the second water inlet. When the second water inlet is in a closed state, the control valve water inlet switches from an open state to a closed state; and when the second water inlet is in an open state, the control valve water inlet switches from the closed state to the open state.

According to another exemplary embodiment, a backflow prevention system for use with a bathroom apparatus is provided. The backflow prevention system includes a backflow water tank assembly, a control valve, a control valve sealing element, a water pump, and a pressure stabilization valve. The backflow water tank assembly includes a water tank having a water holding chamber, a first water inlet, a second water inlet, and a water outlet. The control valve is in the water tank, and the control valve includes a water intake chamber, a first water discharge chamber in fluid communication with the first water inlet, a second water discharge chamber in fluid communication with the second water inlet, a control valve water inlet that selectively fluidly connects the water intake chamber and the first water discharge chamber, and a through hole the fluidly connects the second water discharge chamber and the water intake chamber. The control valve sealing element is configured to open and close the control valve water inlet. The water pump is in fluid communication with the water outlet. The pressure stabilization valve is in fluid communication with the water intake chamber of the control valve. When the second water inlet is in a closed state, the control valve water inlet switches from an open state to a closed state; and when the second water inlet is in an open state, the control valve water inlet switches from the closed state to the open state.

One non-limiting example of an object of the present application is to overcome the drawbacks of the prior art by providing a backflow prevention device with simple structure, convenient operations and steady running, and a backflow prevention system.

The technical solution of the present application provides a backflow prevention water tank that includes a water tank having a water-holding chamber, a control valve disposed inside the water tank, and a float disposed inside the water-holding chamber; the water tank is further formed with a first water inlet, a second water inlet and a water outlet thereon that are in communication with the water-holding chamber; the control valve including a water intake chamber in communication with an external water supply pipe, a first water discharge chamber in communication with the first water inlet, and a second water discharge chamber in communication with the second water inlet; the water intake chamber communicates with the first water discharge chamber via a control valve water inlet, and a control valve sealing element is further disposed inside the control valve for controlling the control valve water inlet to open or close; the second water discharge chamber is formed above the control valve sealing element, a sealing element through hole is formed on the control valve sealing element, and the second water discharge chamber communicates with the water intake chamber via the sealing element through hole; a slide bar that is in contact with the float is further disposed inside the water-holding chamber, and the slide bar is capable of moving toward the side of the second water inlet under the action of the float; a slide bar sealing element is further disposed on the slide bar for controlling the second water inlet to open or close; when the second water inlet is in a closed state, the control valve water inlet is switched from an opening state to a closed state; when the second water inlet is in an opening state, the control valve water inlet is switched from the closed state to the opening state.

Furthermore, a connecting bar may be further disposed on the slide bar, the connecting bar has a contact end capable of being in contact with the float and a hinge end for hinge connection in the backflow prevention water tank, the slide bar is connected between the contact end and the hinge end, and the distance between the hinge end and the slide bar is smaller than the distance between the contact end and the slide bar.

Furthermore, a guide pipe may be provided and configured to extend vertically downward from the position of the second water inlet on the water tank, and the second water inlet is formed at the end of the guide pipe. A sleeve may be provided and disposed on the slide bar for engagement with the guide pipe, and the slide bar sealing element may be disposed inside the sleeve. The sleeve may be capable of engagement on the guide pipe by sliding up and down.

A ring-shaped water-separating rib may be disposed on the outer side of the water discharge chamber and between the water intake chamber and the first water discharge chamber. The control valve sealing element may be disposed above the water intake chamber and the first water discharge chamber, and the control valve water inlet may be formed between the water-separating rib and the control valve sealing element; under the action by the water pressure inside the control valve, the control valve sealing element is capable of moving downward to engage with the water-separating rib for closing the control valve water inlet, or moving upward to disengage from the water-separating rib for opening the control valve water inlet.

Furthermore, the control valve sealing element may be a rubber membrane, a support element may be further disposed above the water intake chamber and the first water discharge chamber, the rubber membrane is installed on the support element, and the sealing element through hole is formed on the support element.

Furthermore, the water tank may include a water tank housing and a water tank lid installed on the water tank housing, the water-holding chamber may be formed inside the water tank housing, the first water inlet and the second water inlet may be formed on/in the water tank lid, the water outlet is disposed on the bottom of the water tank housing, and the control valve may be installed inside the water tank lid.

Furthermore, the first water discharge chamber may be provided with a first water discharge pipe, the water tank may be provided with a first water inlet pipe in communication with the first water inlet, and the first water discharge pipe is in communication with the first water inlet pipe via a water supply tube; the second water discharge chamber is provided with a second water discharge pipe, the water tank is provided with a second water inlet pipe in communication with the second water inlet, and the second water discharge pipe is in communication with the second water inlet pipe via another water supply tube.

Furthermore, the water tank may include an overflow port thereon.

One non-limiting example of a technical solution that the present application may provide is a backflow prevention system, which has the backflow prevention water tank according to any one of the preceding technical solutions, a water pump, and a pressure stabilization valve; where the pressure stabilization valve is in communication with the water intake chamber in the backflow prevention water tank, and the water pump is in communication with the water outlet in the backflow prevention water tank.

Furthermore, the water intake chamber may include a control valve water inlet pipe thereon, the control valve water inlet pipe may be connected with the pressure stabilization valve via a water supply tube, and the water pump may be connected with the water outlet via another water supply tube.

The above technical solutions provide numerous advantages, several of which are discussed below. That is the backflow prevention water tank and systems of this application may achieve the advantageous effects discussed below.

The backflow prevention water tank according to an exemplary embodiment of the present application drives the slide bar to move upward by means of the float, when water in the water tank meets designated conditions, the slide bar moves upward to a designated position, the slide bar sealing element thereabove plugs the second water inlet, while the water intake chamber continues to supply water into the second water discharge chamber, such that the water pressure in the second water discharge chamber increases, and the control valve sealing element is made to move downward to decrease the control valve water inlet until it is closed. When the control valve water inlet is closed, the first water discharge chamber stops supplying water into the water-holding chamber.

When water in the water-holding chamber is discharged, the float and the slide bar move downward under the action of their own weight, thereby driving the slide bar sealing element to move downward so as to open the second water inlet, and at this moment, water in the second water discharge chamber rapidly flow into the water-holding chamber via the second water inlet, such that the water pressure in the second water-holding chamber decreases. Under the action of the water pressure of the water intake chamber, the control valve sealing element moves upward to open the control valve water inlet, and at this moment, the first water discharge chamber begins to supply water into the water-holding chamber.

As a result, the backflow prevention water tank according to one or more exemplary embodiments of the present application controls the water pressure conversion inside the control valve by means of a float, controls the movement of the control valve sealing element through the water pressure difference inside the control valve, and then controls the opening or closing of the control valve water inlet, thereby controlling the water flow transported into the water tank by an external water supply apparatus and effectively avoiding backflow. Due to the adoption of a purely mechanical structure, in the meantime, it has a simple structure and high reliability, and lowers the cost.

The backflow prevention system according to one or more exemplary embodiments of the present application effectively decreases the water pressure entering the water tank by providing a pressure stabilization valve at the water inlet end, a float of a relatively small volume can also plug the second water inlet, thereby reducing the float volume and consequently reducing the volume of the water tank.

In summary, the backflow prevention water tank and the backflow prevention system according to one or more exemplary embodiments of the present application have simple structures, which employ a mechanical structure to control the opening or closing of the second water inlet and the control valve water inlet, have a high reliability, lower the cost, and reduce the volume of the water tank.

DETAILED DESCRIPTION

Figure 1:
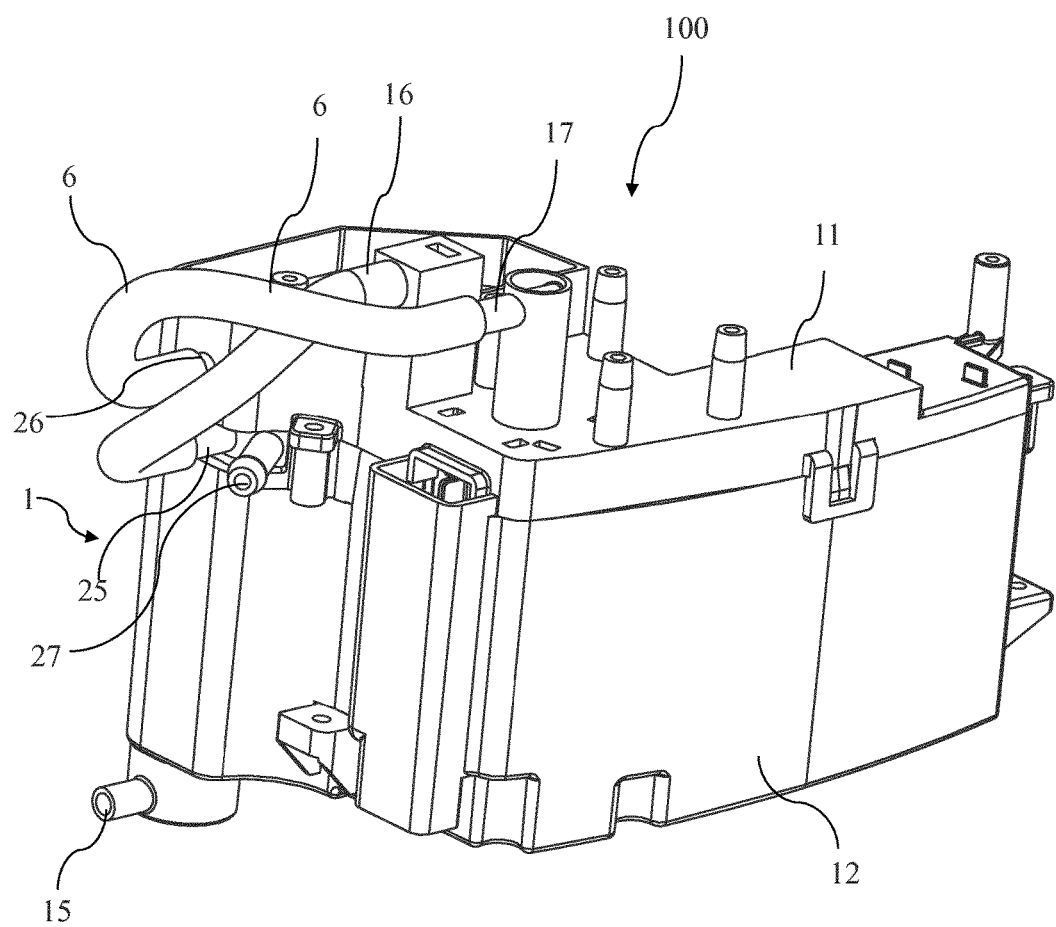
FIG. 1 is a perspective view of the backflow prevention water tank, according to an exemplary embodiment of the present application.
Figure 2:
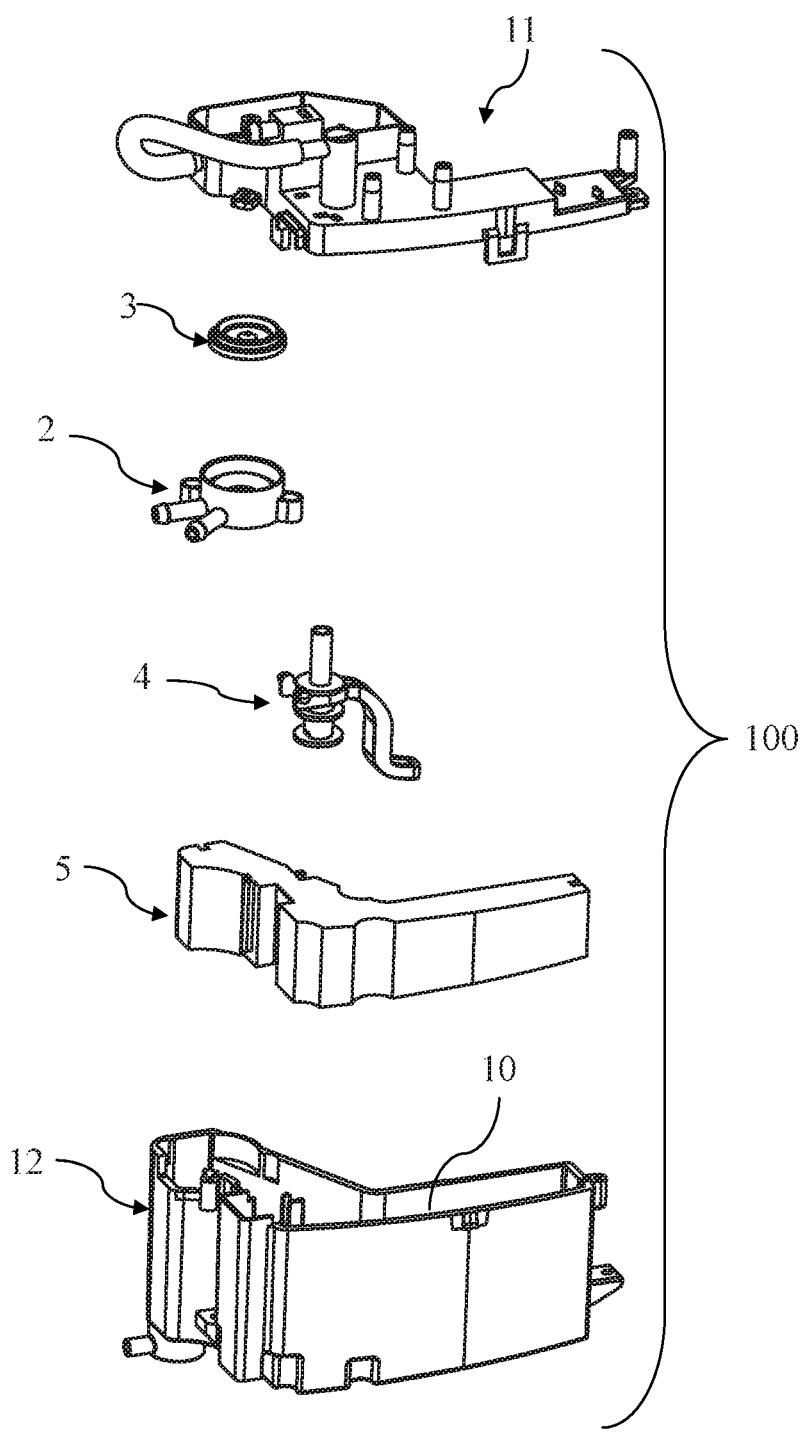
FIG. 2 is an exploded view of the backflow prevention water tank shown in FIG. 1.
Figure 3:
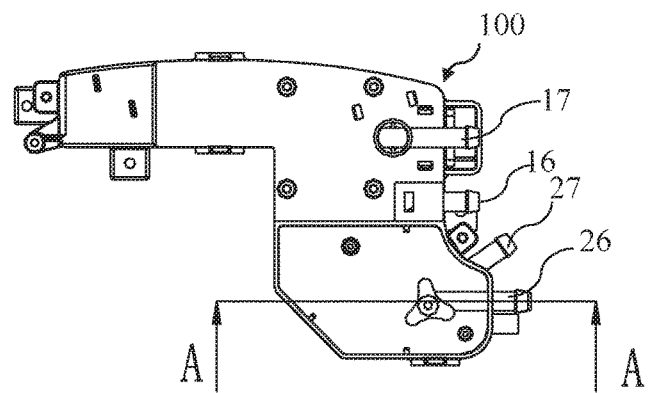
FIG. 3 is a top view of the backflow prevention water tank shown in FIG. 1 from a first angle.
Figure 4:
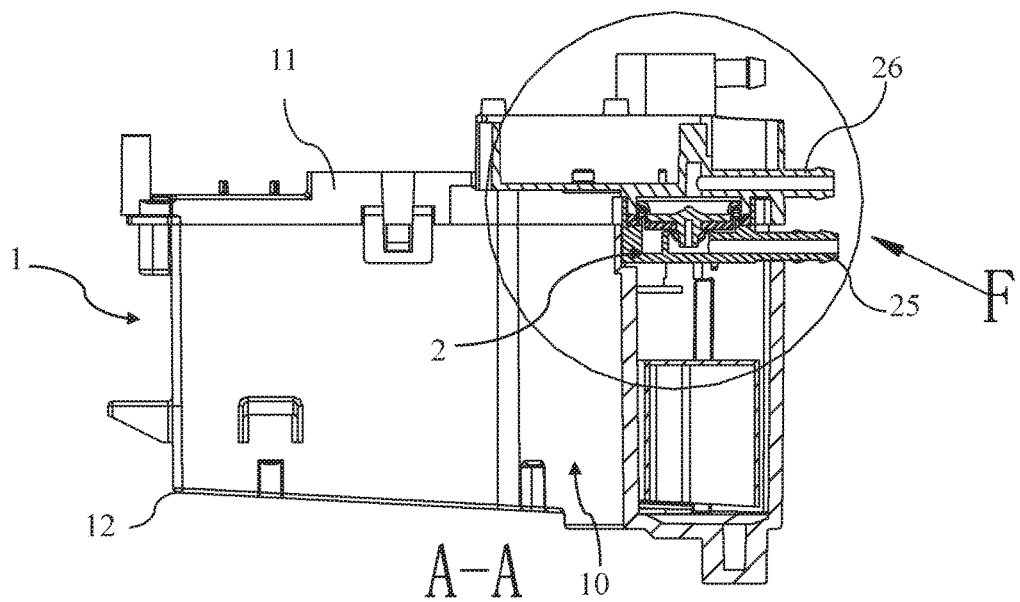
FIG. 4 is a cross-sectional view of the backflow prevention water tank along line A-A shown in FIG. 3.

FIGS. 1-17 illustrate a backflow prevention water tank 100, according to an exemplary embodiment, that includes a water tank 1 having a water-holding chamber 10. A control valve 2 is disposed inside the water tank 1; and a float 5 is disposed inside the water-holding chamber 10.

The water tank 1 may include a first water inlet 13 (see FIG. 17), a second water inlet 14 (see FIG. 10), and a water outlet 15 (see FIG. 1). The first water inlet 13, the second water inlet 14 and/or the water outlet 15 may be in communication (e.g., fluid communication, fluidly connected, etc.) with the water-holding chamber 10.

Figure 5:
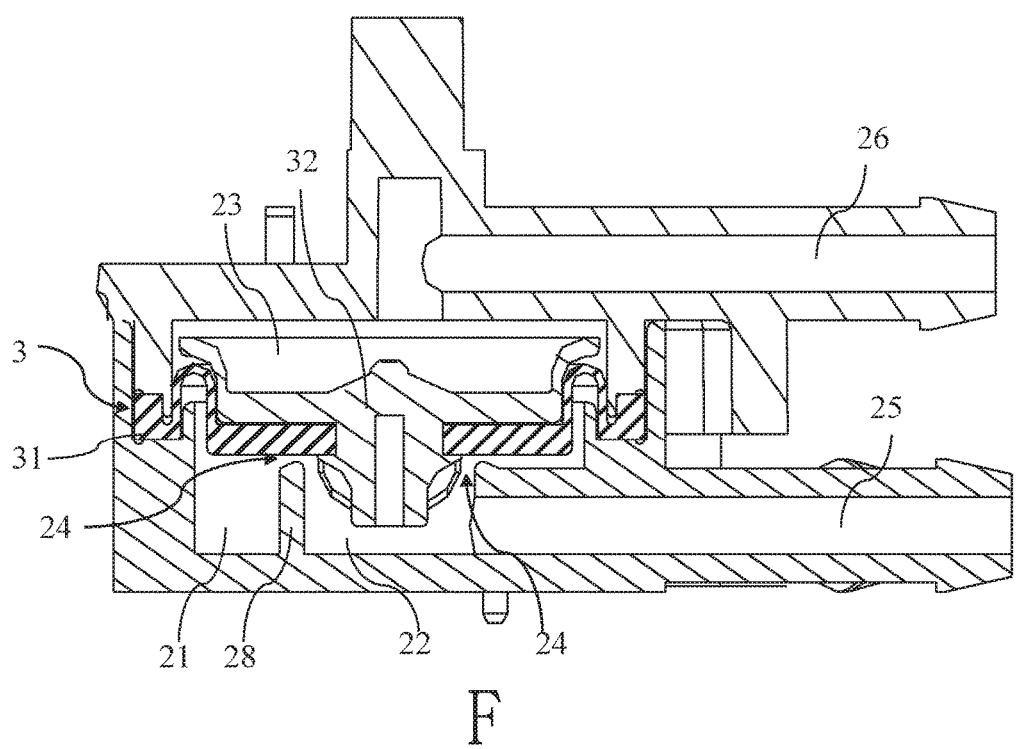
FIG. 5 is an enlarged view of region F of the backflow prevention water tank shown in FIG. 4.
Figure 6:
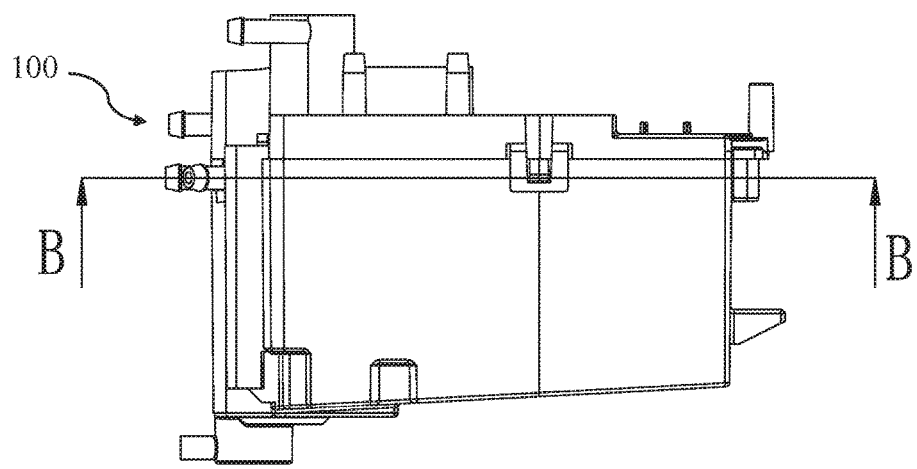
FIG. 6 is a side view of the backflow prevention water tank shown in FIG. 1.
Figure 7:
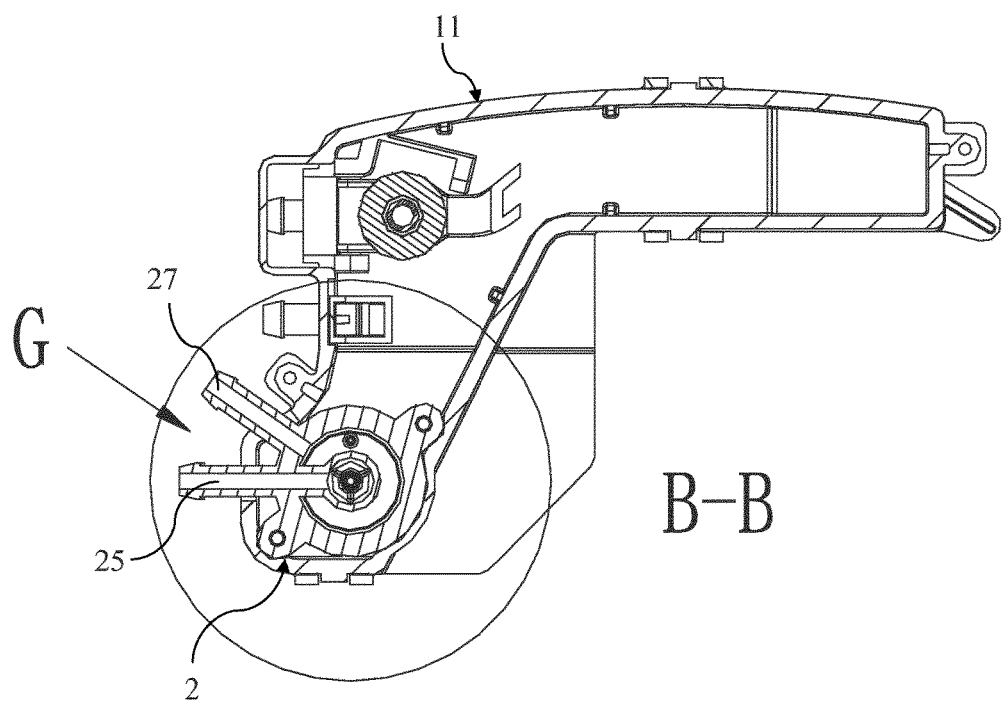
FIG. 7 is a cross-sectional view of the backflow prevention water tank along line B-B shown in FIG. 6.
Figure 8:
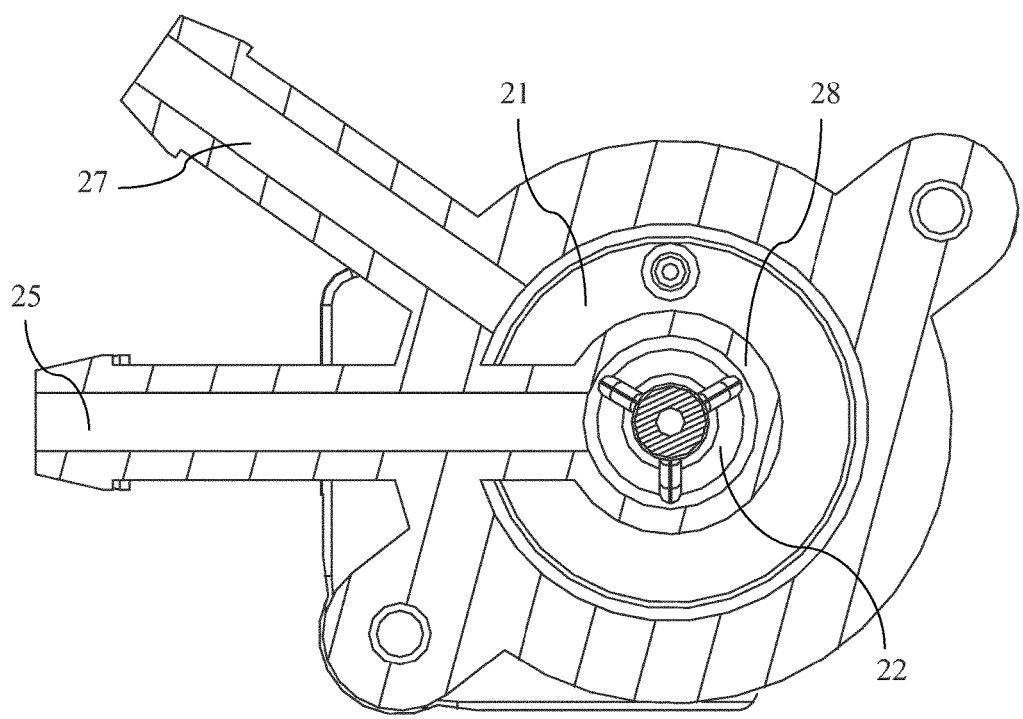
FIG. 8 is an enlarged view of region G of the backflow prevention water tank shown in FIG. 7.
Figure 9:
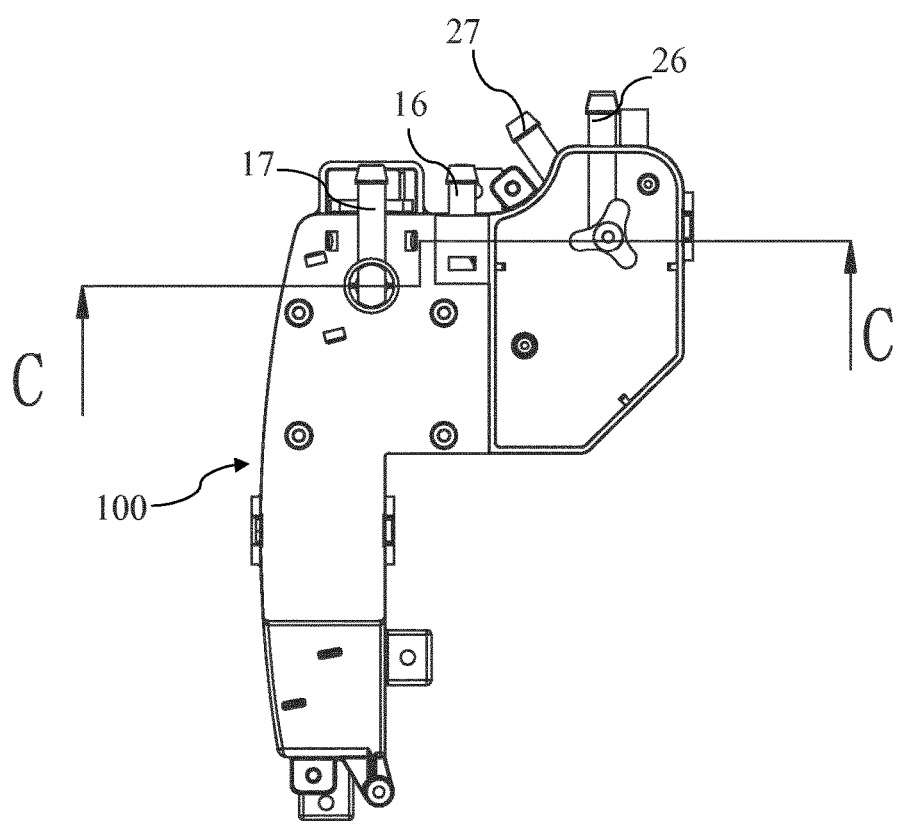
FIG. 9 is a top view of the backflow prevention water tank shown in FIG. 1 from a second angle.
Figure 10:
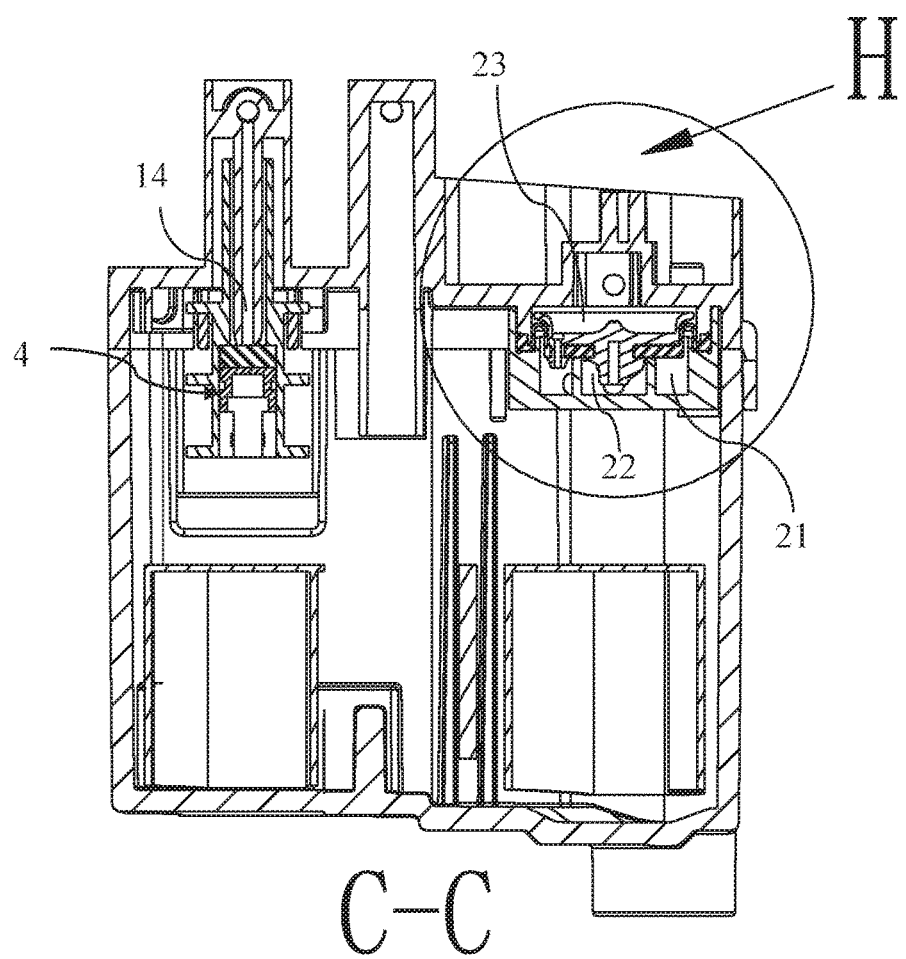
FIG. 10 is a cross-sectional view of the backflow prevention water tank along line C-C shown in FIG. 9.

As shown in FIGS. 5 and 8, the control valve 2 includes a water intake chamber 21 in communication with an external water supply pipe, a first water discharge chamber 22 in communication with the first water inlet 13, and a second water discharge chamber 23 in communication with the second water inlet 14.

The water intake chamber 21 communicates with the first water discharge chamber 22 through a control valve water inlet 24. As shown in FIG. 5, a control valve sealing element 3 is disposed inside the control valve 2 for controlling the opening and closing of the control valve water inlet 24 (e.g., the control valve sealing element 3 may open and close the control vale water inlet 24 through movement between open and closes positions/states).

The second water discharge chamber 23 may be located (e.g., formed, disposed, etc.) above the control valve sealing element 3. A sealing element through hole 33 may be formed on the control valve sealing element 3 (see FIG. 11), and the second water discharge chamber 23 communicates with the water intake chamber 21 through the sealing element through hole 33.

A slide bar 4 that is in contact with the float 5 may be disposed inside the water-holding chamber 10. The slide bar 4 is capable of moving toward the side of the second water inlet 14 under the action of the float 5. That is, the slide bar 4 is configured to move toward and/or away the second water inlet 14 under a force exerted by the float 5 (e.g., induced by movement of the float).

Figure 14:
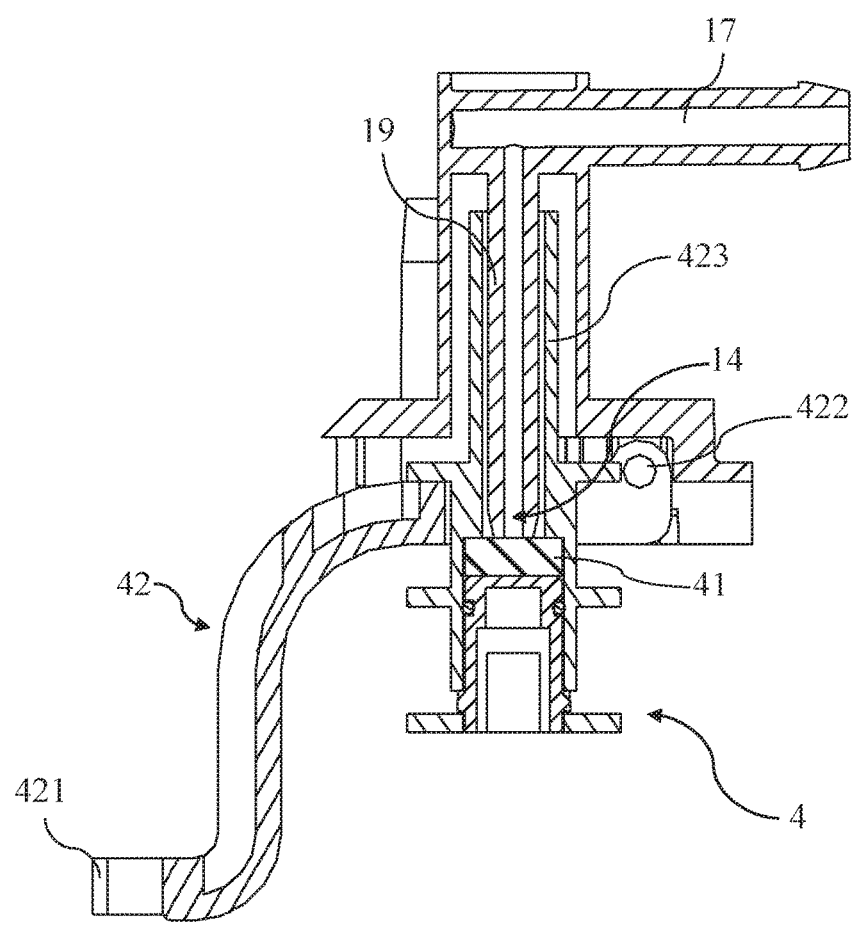
FIG. 14 is an enlarged view of a portion of the backflow prevention water tank shown in FIG. 13, including the engagement of the slide bar and the guide pipe.
Figure 15:
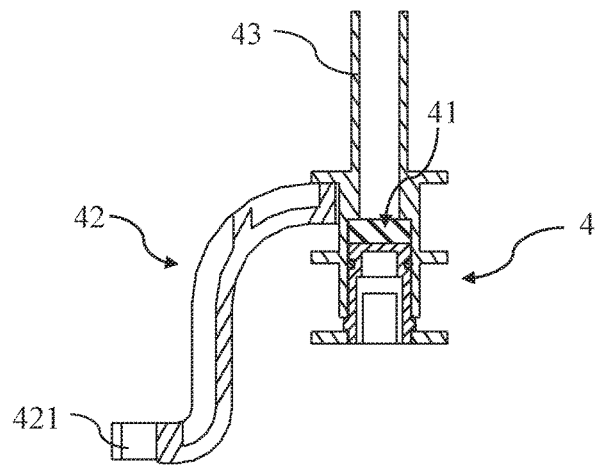
FIG. 15 is a cross-sectional view of the slide bar shown in FIG. 14.
Figure 16:
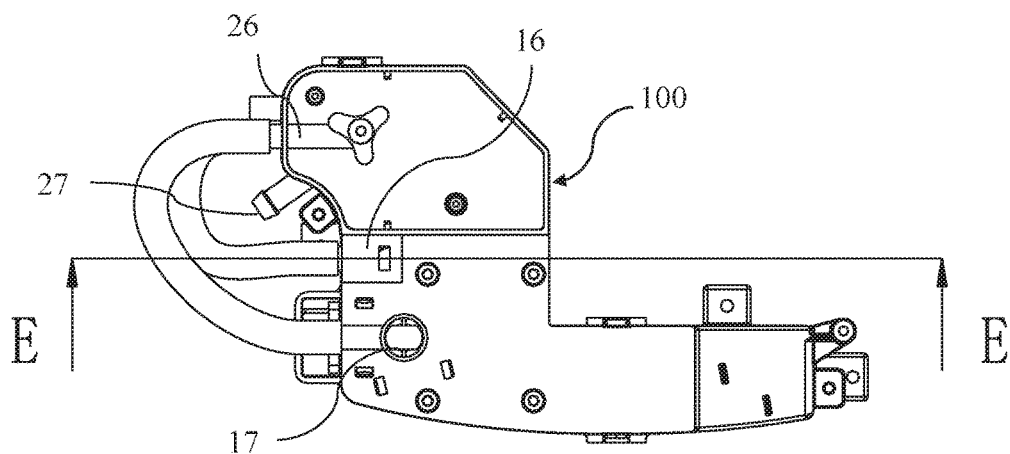
FIG. 16 is a top view of the backflow prevention water tank shown in FIG. 1 from a fourth angle.
Figure 17:
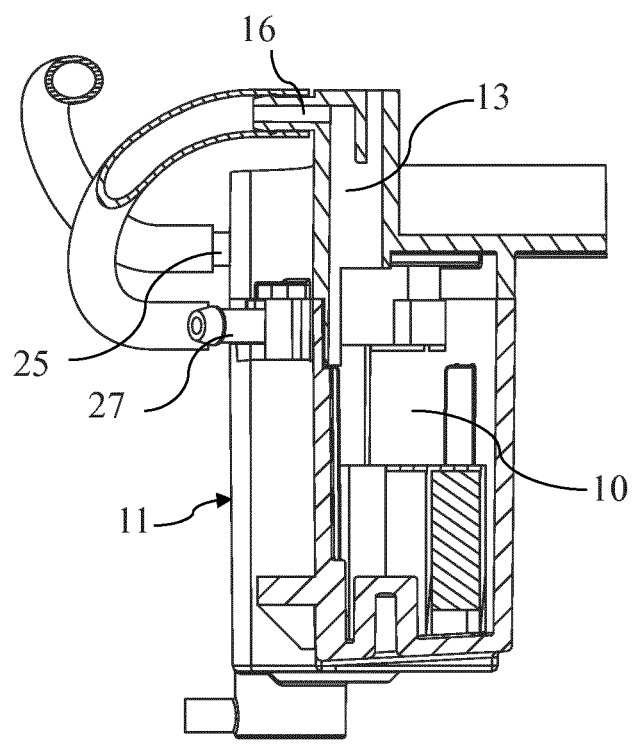
FIG. 17 is a cross-sectional view of the backflow prevention water tank along line E-E shown in FIG. 16.

As shown in FIG. 14, a slide bar sealing element 41 is disposed on the slide bar 4 for controlling the second water inlet 14 to open or close. In other words, the slide bar sealing element 41 controls opening and closing of the second water inlet 14, such as through relative movement between the slide bar sealing element 41 and the second water inlet 14.

When the second water inlet 14 is in a closed state, the control valve water inlet 24 is switched from an open state (e.g., opening state) to a closed state; and when the second water inlet 14 is in an open state, the control valve water inlet 24 is switched from the closed state to the open state.

In other words, according to one non-limiting example, the backflow prevention water tank 100 includes the water tank 1, the control valve 2, the control valve sealing element 3, the slide bar 4, and the float 5.

The water tank 1 has the water-holding chamber 10 therein (e.g., the chamber may be defined at least in part by the tank). The water tank 1 may include the first water inlet 13 and the second water inlet 14, which may be formed thereon (or formed separately and coupled thereto), for supplying water into the water-holding chamber 10. The water tank 1 may include the water outlet 15, which may be formed thereon (or formed separately and coupled thereto), for the output of the water-holding chamber 10.

The control valve 2 is disposed inside the water tank 1, and the control valve 2 includes the water intake chamber 21, the first water discharge chamber 22, and the second water discharge chamber 23. The control valve water inlet 24 is disposed between the water intake chamber 21 and the first water discharge chamber 22, and the two are in communication with each other through the control valve water inlet 24.

The control valve sealing element 3 is disposed inside the control valve 2, which is positioned above the first water discharge chamber 22 and the water intake chamber 21. The second water discharge chamber 23 may be disposed (e.g., formed) above the control valve sealing element 3, and the sealing element through hole 33 may be coupled to or formed on the control valve sealing element 3, which is in communication with the water intake chamber 21, such that the second water discharge chamber 23 is in communication with the water intake chamber 21 through the sealing element through hole 33.

The water intake chamber 21 is connected with an external water supply pipe for supplying water into the control valve 2. The first water discharge chamber 22 is in communication with the first water inlet 13 for supplying water into the water-holding chamber 10. The second water discharge chamber 23 is in communication with the second water inlet 14, also for supplying water into the water-holding chamber 10.

With such a configuration, two pipelines are formed when a water flow enters the water intake chamber 21 for supplying water into water-holding chamber 10.

The first water supply pipeline is that a relatively large quantity of water (e.g., compared to the smaller quantity of the second pipeline) in the water intake chamber 21 sequentially passes the control valve water inlet 24, the first water discharge chamber 22, and the first water inlet 13, and then enters the water-holding chamber 10.

The second water supply pipeline is that a relatively small quantity of water in the water intake chamber 21 sequentially passes the sealing element through hole 33, the second water discharge chamber 23, and the second water inlet 14, and then enters the water-holding chamber 10.

The control valve sealing element 3 is capable of, under the action by a force due to the water pressure inside the control valve 2, opening and closing the control valve water inlet 24. Specifically, under a normal state (e.g., an initial state), the control valve sealing element 3 moves upward to be in an open position under the action by the water pressure, as the water pressure inside the water intake chamber 21 is greater than the water pressure inside the second water discharge chamber 23, such that the control valve water inlet 24 is in an open (e.g., opening) state, and the water intake chamber 21 supplies water to the first water discharge chamber 22. When the second water inlet 14 is closed, water in the water intake chamber 21 will continue to flow into the second water discharge chamber 23, such that the water pressure inside the second water discharge chamber 23 increases, and at this moment, the second water inlet 14 is not closed yet, water in the water intake chamber 21 will still enter the first water discharge chamber 22, such that the water pressure inside the second water discharge chamber 23 is greater than the water pressure inside the water intake chamber 21, the control valve sealing element 3 moves downward to be in a closed position under the action by the water pressure, which makes (e.g., moves) the control valve water inlet 24 to be in a closed state and the water intake chamber 21 stops supplying water to the first water discharge chamber 22.

The slide bar sealing element 41 may be provided to control the opening and closing of the second water inlet 14. As shown, the slide bar sealing element 41 is disposed on the slide bar 4, the slide bar 4 is disposed inside the water-holding chamber 10, and is in contact with the float 5 disposed inside the water-holding chamber 10.

The float 5 is capable of moving upward (and downward) under the action of water's buoyancy force, thereby driving the slide bar 4 to move upward (and downward) to drive the slide bar sealing element 41 to plug (or open) the second water inlet 14, such that the second water inlet 14 is in a closed state (or open state). When a preset quantity of water has been discharged from the water-holding chamber 10, the float 5 and the slide bar 4 fall under their own gravity forces, such that the slide bar sealing element 41 is disengaged from the second water inlet 14, such that the second water inlet 14 is in an open state.

With such a configuration, the relationship between the second water inlet 14 and the control valve water inlet 24 is that when the second water inlet 14 is in a closed state, the control valve water inlet 24 is switched from an open state to a closed state; and when the second water inlet 14 is in an open state, the control valve water inlet 24 is switched from the closed state to the open state.

According to one exemplary embodiment, the specific operating process is that when the control valve water inlet 24 is in an open state, a relatively large quantity of water is supplied into the water-holding chamber 10 through the first water discharge chamber 22, and a relatively small quantity of water is supplied into the water-holding chamber 10 through the second water discharge chamber 23. As water in the water-holding chamber 10 gradually increases, the float 5 will drive the slide bar 4 to move upward or to move toward the side of the second water inlet 14.

When water in the water-holding chamber 10 increases to a preset quantity (e.g., amount, volume, etc.), the slide bar sealing element 41, moving upward along with the float 5 and the slide bar 4, plugs the second water inlet 14, such that the second water discharge chamber 23 stops supplying water into the water-holding chamber 10. At this moment, the water pressure in the second water discharge chamber 23 gradually increases and is greater than the water pressure in the water intake chamber 21. Under the action by the water pressure, the control valve sealing element 3 moves downward and closes the control valve water inlet 24, such that the control valve water inlet 24 is in the closed state, and the first water discharge chamber 22 stops supplying water into the water-holding chamber 10.

When a preset quantity of water has been discharged from the water-holding chamber 10 through the water outlet 15, the float 5 and the slide bar 4 move downward under their own gravity forces, such that the slide bar sealing element 41 is disengaged from the second water inlet 14, such that the second water inlet 14 is in an open state. When the second water inlet 14 is in an open state, water in the second water discharge chamber 23 will rapidly flow into the water-holding chamber 10, such that the water pressure in the second water discharge chamber 23 decreases, and at this moment, the water pressure in the second water discharge chamber 23 is lower than the water pressure in the water intake chamber 21. Under the action by the water pressure, the control valve sealing element 3 moves upward and opens the control valve water inlet 24, such that the control valve water inlet 24 is in the open state, and the first water discharge chamber 22 begins to supply water into the water-holding chamber 10.

In such a way, it can be achieved that, when water in the water-holding chamber 10 increases to a preset quantity, the second water inlet 14 is closed, and at the same time, the control valve water inlet 24 is closed as well, and the first water discharge chamber 22 stops supplying water into the water-holding chamber 10; when water in the water-holding chamber 10 decreases to a preset quantity, the second water inlet 14 is opened, and at the same time, the control valve water inlet 24 is opened as well, the first water discharge chamber 22 begins to supply water into the water-holding chamber 10, and the switch between water supply/water replenishing is realized.

As a result, the backflow prevention water tanks according to the present application control the water pressure transition inside the control valve by means of a float (e.g., the float 5), control the movement of the control valve sealing element through the water pressure difference inside the control valve, and then control the opening or closing of the control valve water inlet, thereby controlling the water flow transported into the water tank by an external water supply apparatus and effectively avoiding backflow. Due to the adoption of a purely mechanical structure, in the meantime, it has a simple structure and high reliability, and lowers the cost.

To realize the linear movement of the slide bar 4 in the water-holding chamber 10, a guide post may be provided and the slide bar 4 may be configured to engage with the guide post.

The control valve sealing element 3 in the present application may be supported at the control valve water inlet 24 by a support element, or one side thereof may be connected onto the control valve water inlet 24, as long as the control valve sealing element 3 can close the control valve water inlet 24 when the water pressure in the second water discharge chamber 23 increases, and the control valve sealing element 3 can open the control valve water inlet 24 when the water pressure in the second water discharge chamber 23 decreases.

The float 5 is configured to remain in contact with the slide bar 4 during the rising process, so as to drive the slide bar 4 to rise. During the falling process, both the float 5 and the slide bar 4 are configured to move down, such as under their own weight (e.g., gravity), and after a predetermined travel, the float 5 and the slide bar 4 may move out of contact (i.e., no longer contact each other).

As shown in FIGS. 2 and 13-15, a connecting bar 42 is disposed on the slide bar 4. The connecting bar 42 has a contact end 421 capable of being in contact with the float 5 and a hinge end 422 for hinge connection in the backflow prevention water tank 100. The slide bar 4 is connected between the contact end 421 and the hinge end 422, and, for example, the distance between the hinge end 422 and the slide bar 4 may be smaller than the distance between the contact end 421 and the slide bar 4.

The connecting bar 42 is configured to increase the mechanical advantage (e.g., the length of the arm to which the force is applied), such that the torque of the float 5 increases. Accordingly, the connecting bar 42 may act like a magnification bar. The connecting bar 42 includes the contact end 421 and the hinge end 422, where the contact end 421 is used to selectively contact the float 5, the hinge end 422 is hinged in the backflow prevention water tank 100. More specifically, the hinge end 422 can be hinged to the water tank lid 11, or can be hinged to the water tank housing 12, depending on the application. The slide bar 4 is connected between the contact end 421 and the hinge end 422.

As a result, when the float 5 moves up and down, the connecting bar 42 can rotate around the hinge end 422, so as to drive the slide bar 4 to move up and down.

Moreover, as the distance between the hinge end 422 and the slide bar 4 is smaller than the distance between the contact end 421 and the slide bar 4, the arm of force (e.g., moment arm distance) of the float 5 is greater than the arm of force of the slide bar 4. When the float 5 rises, the torque acting on the slide bar 4 increases due to the arm of force, which consequently can reduce the volumes of the water tank 1 and the float 5.

As shown in FIGS. 12-15, a guide pipe 19 is provided, which extends vertically downward from the position of the second water inlet 14 on the water tank 1, and the second water inlet 14 is formed at the end of the guide pipe 19.

A sleeve 43 is disposed on the slide bar 4 for engagement with the guide pipe 19, the slide bar sealing element 41 is disposed inside the sleeve 43, and the sleeve 43 is capable of engagement on the guide pipe 19 by sliding up and down.

In other words, the guide pipe 19 is further disposed in the water tank 1, and the second water inlet 14 is disposed at the end of the guide pipe 19. On one hand, the guide pipe 19 plays a role of guiding the sliding of the slide bar 4, and on the other hand, it also plays a role of supplying water to the second water inlet 14.

The sleeve 43 is disposed on the slide bar 4, and as shown in FIG. 14, an inside diameter of the sleeve 43 is greater than the outside diameter of the guide pipe 19, and the slide bar sealing element 41 is disposed inside the sleeve 43. During assembly, the sleeve 43 is fitted over the guide pipe 19, and the sleeve 43 is capable of sliding up and down along the guide pipe 19, so as to drive the slide bar sealing element 41 to plug the second water inlet 14 or open the second water inlet 14.

According to an exemplary embodiment, the slide bar sealing element 41 is a rubber gasket, which is elastic, has good sealing effect, and is durable. Thus, the slide bar sealing element 41 may include a rubber material.

As shown in FIGS. 4-11, each of the water intake chamber 21 and the first water discharge chamber 22 is substantially ring shaped (e.g., semi-annular), the water intake chamber 21 is disposed on the outer side of the first water discharge chamber 22, and a substantially ring-shaped water-separating rib 28 is disposed between the water intake chamber 21 and the first water discharge chamber 22.

The control valve sealing element 3 may be located (e.g., disposed) above the water intake chamber 21 and the first water discharge chamber 22, and the control valve water inlet 24 may be formed between the water-separating rib 28 and the control valve sealing element 3.

Under the action by the water pressure inside the control valve 2, the control valve sealing element 3 is capable of moving downward to engage with the water-separating rib 28 for closing the control valve water inlet 24, or moving upward to disengage from the water-separating rib 28 for opening the control valve water inlet 24.

When water can overflow the water-separating rib 28, water will flow from the water intake chamber 21 into the first water discharge chamber 22 through the control valve water inlet 24. By configuring both the water intake chamber 21 and the first water discharge chamber 22 to be substantially ring shaped, it is favorable for the overall structure layout and advantageously reduces the structural size.

Moreover, the control valve water inlet 24 may be configured to be ring shaped as well, which is similar to the ring-shaped water-separating rib 28. The water-separating rib 28 may be ring shaped and disposed underneath the control valve sealing element 3, which consequently increases the area of the control valve water inlet 24, making it favorable for the water intake chamber 21 to rapidly supply water into the first water discharge chamber 22.

When the water pressure in the water intake chamber 21 is lower than or equal to the water pressure in a discharge chamber (e.g., the first water discharge chamber 22, the second water discharge chamber 23), the control valve sealing element 3 moves to the side of the water-separating rib 28, and is sealingly engaged on the water-separating rib 28, so as to close the control valve water inlet 24 such that the control valve water inlet 24 is in the closed state.

When the water pressure in the water intake chamber 21 is greater than the water pressure in in a discharge chamber (e.g., the first water discharge chamber 22, the second water discharge chamber 23), the control valve sealing element 3 moves to the side away from the water-separating rib 28, and consequently open the control valve water inlet 24 such that the control valve water inlet 24 is in the opening state.

Figure 11:
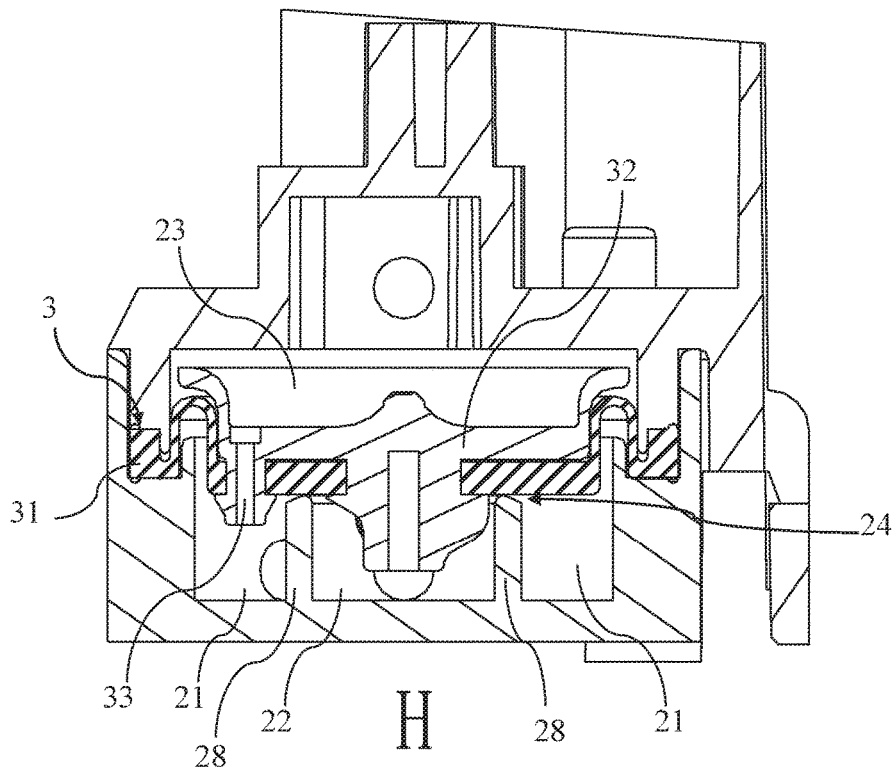
FIG. 11 is an enlarged view of region H in the backflow prevention water tank shown in FIG. 10.

As shown in FIGS. 5 and 11, the control valve sealing element 3 includes a flexible membrane 31. For example, the flexible membrane 31 may include a rubber material. The support element 32 is disposed above the water intake chamber 21 and the first water discharge chamber 22. The flexible membrane 31 is installed on the support element 32, and the sealing element through hole 33 is formed on/in the support element 32.

The flexible membrane 31 including rubber advantageously is elastic, has good sealing effect, and is durable. To avoid drilling a hole directly on/in the flexible membrane 31, which may affect its service life, the support element 32 is disposed above the water intake chamber 21 and the first water discharge chamber 22 to form the sealing element through hole 33 on the support element 32, and allowing the flexible membrane 31 to be coupled (e.g., installed) on the support element 32. On one hand, such a configuration improves the sealing effect, and on the other hand, the service life of the flexible membrane is extended.

As shown in FIGS. 1, 4, 13, 14, and 17, the water tank 1 includes a water tank housing 12 and a water tank lid 11, which may be coupled to (e.g., installed on) the water tank housing 12. The water-holding chamber 10 may be defined by (e.g., formed inside) the water tank housing 12. The first water inlet 13 and the second water inlet 14 may be provided in (e.g., formed on) the water tank lid 11. The water outlet 15 may be disposed on the bottom of the water tank housing 12, and the control valve 2 may be disposed in/on (e.g., installed inside) the water tank lid 11.

Such a configuration facilitates disassembly and installation, and facilitates injecting water from top into the water-holding chamber 10 and discharging water out of the water-holding chamber 10 from the bottom.

As shown in FIGS. 1, 3-5, 7-9, 16, and 17, the first water discharge chamber 22 is provided with a first water discharge pipe 25, the water tank 1 is provided with a first water inlet pipe 16 in communication (e.g., fluid communication) with the first water inlet 13, and the first water discharge pipe 25 is in communication with the first water inlet pipe 16 through a water supply tube 6.

Figure 12:
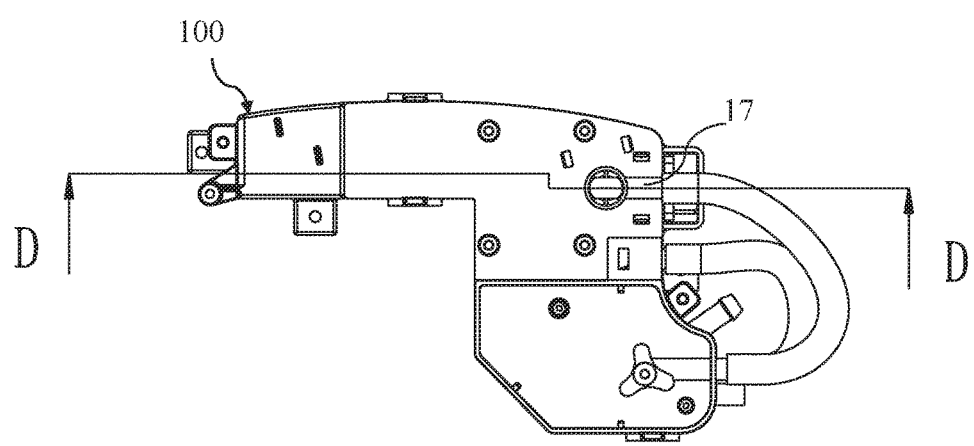
FIG. 12 is a top view of the backflow prevention water tank shown in FIG. 1 from a third angle.

The second water discharge chamber 23 is provided with a second water discharge pipe 26, the water tank 1 is provided with a second water inlet pipe 17 in communication (e.g., fluid communication) with the second water inlet 14, as shown in FIG. 12, and the second water discharge pipe 26 is in communication with the second water inlet pipe 17 through another water supply tube 6.

Such a configuration facilitates pipe connection and water flow. More specifically, the first water discharge pipe 25, the second water discharge pipe 26, the first water inlet pipe 16 and the second water inlet pipe 17 are all disposed on the water tank lid 11, which facilitates such an arrangement.

The second water inlet pipe 17 communicates with the guide pipe 19, and the guide pipe 19 communicates with the second water inlet 14 for supplying water.

Figure 13:
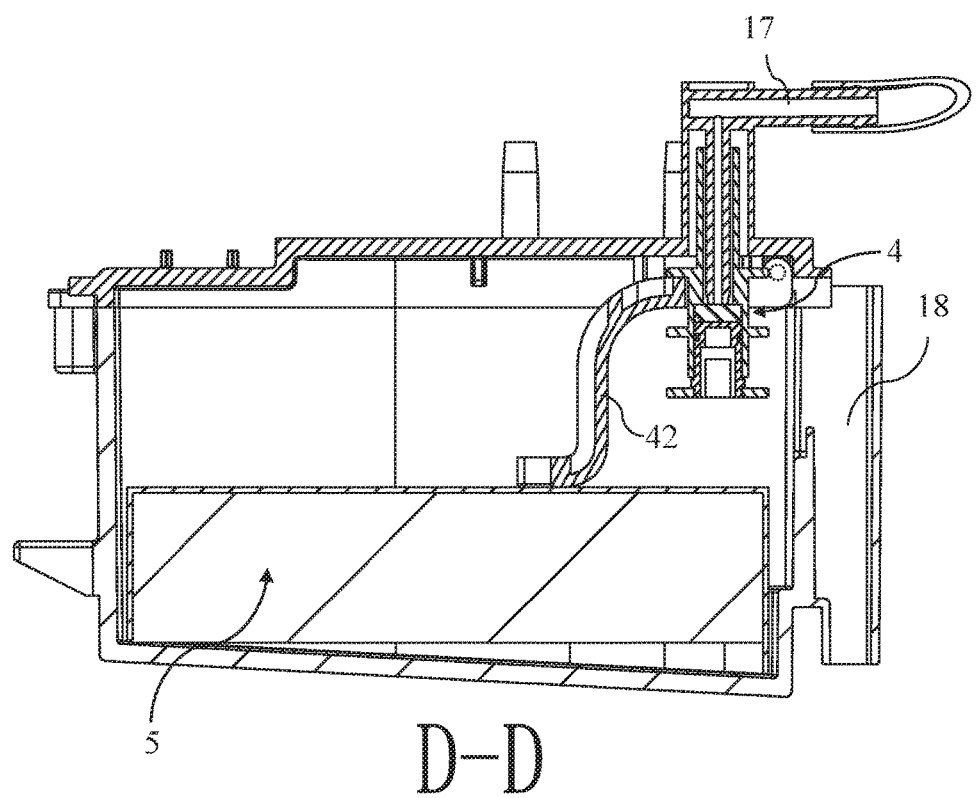
FIG. 13 is a cross-sectional view of the backflow prevention water tank along line D-D shown in FIG. 12.

As shown in FIG. 13, the water tank 1 includes an overflow port 18 provided therein/thereon. More specifically, the overflow port 18 or an overflow pipe may be disposed inside the water tank housing 12. Under specific conditions, due to back pressure or negative pressure in the pipeline, waste water passes through a water use end and a water pump to enter the water tank housing 12, when the waste water level in the water tank housing 12 rises to a certain position, it is discharged into the ceramic bowl via the overflow port 18, which can achieve the function of backflow prevention.

Figure 18:
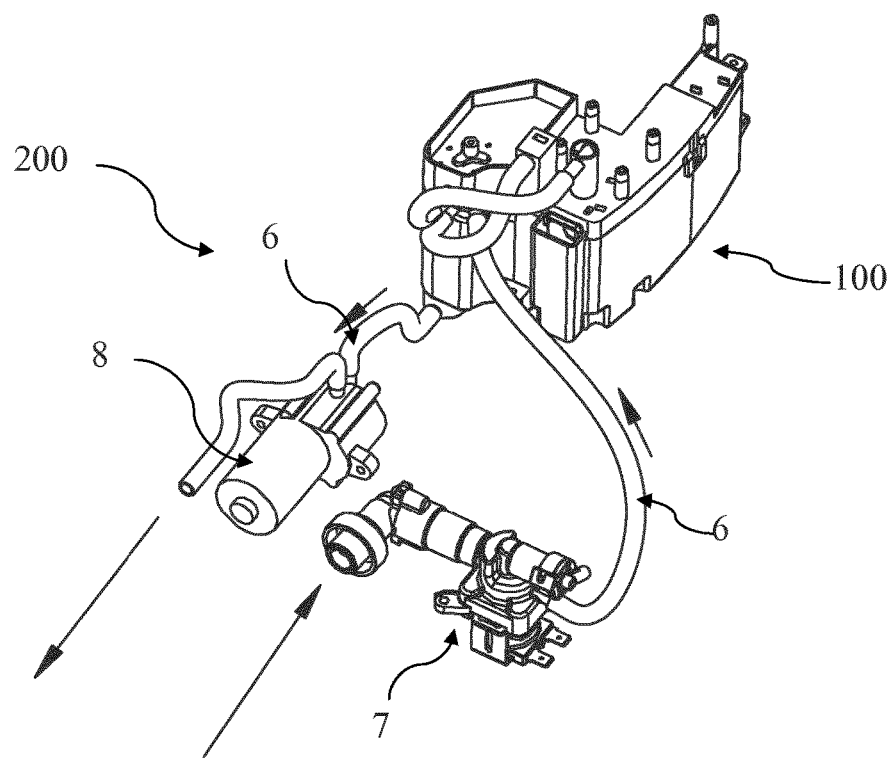
FIG. 18 is a schematic diagram of the backflow prevention system, according to an exemplary embodiment of the present application.

As shown in FIG. 18, another exemplary embodiment of the present application provides a backflow prevention system 200. The backflow prevention system 200 includes the backflow prevention water tank 100, according to any one of the technical solutions disclosed in this application, a water pump 8, and a pressure stabilization valve 7.

The pressure stabilization valve 7 of the system 200 is in communication with the water intake chamber 21 in the backflow prevention water tank 100; and the water pump 8 is in communication (e.g., fluid communication) with the water outlet 15 in the backflow prevention water tank 100.

In other words, the backflow prevention system 200 includes the backflow prevention water tank 100, the pressure stabilization valve 7 and the water pump 8. In combination with FIGS. 1-17, the structure, construction and operating principle (e.g., of the backflow prevention water tank 100) have been described in detail above, which will not be repeated herein.

The pressure stabilization valve 7 is in communication (e.g., fluid communication) with the water intake chamber 21, and the pressure stabilization valve 7 is used for reducing the water pressure entering the water intake chamber 21. If the water pressure entering the water intake chamber 21 is too high (e.g., above a threshold pressure), then it drives the volume of the water tank 1 to be sufficiently large and the volume of the float 5 to be sufficiently large to hold the slide bar 4. By providing the pressure stabilization valve 7 before the water intake chamber 21 for reducing the water pressure of incoming water, the volume of the water tank 1 can be reduced and the volume of the float 5 can be reduced as well. In combination with the role of the connecting bar 42 in increasing the arm of force, the pressure stabilization valve 7 can effectively use torque and arm of force to reduce the force required for the slide bar 4, leading to an advantageous reduction in the volumes of the water tank 1 and/or the float 5.

The water pump 8 is in communication (e.g., fluid communication) with the water outlet 15 for pumping water in the water-holding chamber 10 to a water use end.

As a result, the backflow prevention system according to the present application may further reduce the volumes of the water tank and the float by providing a pressure stabilization valve, which saves space.

As shown in FIGS. 1, 8 and 18, the water intake chamber 21 is provided with a control valve water inlet pipe 27 thereon/therein. The control valve water inlet pipe 27 is connected with the pressure stabilization valve 7 through a water supply tube 6; and the water pump 8 is connected with the water outlet 15 through another water supply tube 6. The connections through the water supply tubes 6 facilitate movement of positions of the parts and facilitates arrangement. In other words, fluidly connecting the water pump 8 and/or the pressure stabilization valve 7 through the two water supply tubes 6 may advantageously allow for the water pump 8 and/or the pressure stabilization valve 7 to be located remotely from the backflow prevention water tank 100 to provide more flexibility with how and where these elements are arranged/located.

In summary, the backflow prevention water tank and the backflow prevention system according to the present application have simple structures, which employ a mechanical structure to control the opening or closing of the second water inlet and the control valve water inlet, have a high reliability, lower the cost, and reduce the volume of the water tank.

The above technical solutions may be combined as needed to achieve optimal technical effects. In other words, any combination of elements disclosed in this application may be utilized based on the application of the systems/tanks.

The above description is only the principle and preferred examples of the present application. It should be noted that a number of other variations may be made by those skilled in the art based on the principle of the present application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that "front", "rear", "left", "right", "up", and "down" used in the description may refer to the directions in the accompanying drawings, and the terms "inner" and "outer" refer to directions toward or away from, for example, a geometric center of a specific part. It should be noted that the orientation of various elements may differ according to other exemplary embodiments, and that such variations are intended to be encompassed by the present disclosure.

The construction and arrangement of the elements of the backflow prevention systems and tanks, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., tank, valves, slide bars, floats, supply tubes, pumps, lids, chambers, housings, inlets, pipes, etc.) disclosed in one embodiment may be incorporated or utilized with any other embodiment disclosed herein.

Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A backflow prevention water tank in fluid communication with an external water supply pipe, the backflow prevention water tank comprising:
    a water tank having a water holding chamber, a first water inlet in fluid communication with the water holding chamber, and a second water inlet in fluid communication with the water holding chamber;
    a control valve disposed inside the water tank and comprising a water intake chamber in fluid communication with the external water supply pipe, a first water discharge chamber in fluid communication with the first water inlet, and a second water discharge chamber in fluid communication with the second water inlet, wherein the water intake chamber fluidly communicates with the first water discharge chamber through a control valve water inlet;
    a control valve sealing element disposed inside the control valve for opening and closing the control valve water inlet, wherein the second water discharge chamber is disposed above the control valve sealing element so that the second water discharge chamber fluidly communicates with the water intake chamber through a sealing element through hole of the control valve sealing element;
    a float disposed inside the water holding chamber;
    a slide bar disposed inside the water holding chamber and in contact with the float, wherein the slide bar moves toward a side of the second water inlet under the action of the float; and a slide bar sealing element disposed on the slide bar for controlling opening and closing of the second water inlet;

wherein when the second water inlet is in a closed state, the control valve water inlet switches from an open state to a closed state; and wherein when the second water inlet is in an open state, the control valve water inlet switches from the closed state to the open state.

2. The backflow prevention water tank of claim 1, further comprising a connecting bar that is disposed on the slide bar, the connecting bar comprising:

a contact end that is configured to contact the float; and a hinge end pivotally connected to the backflow prevention water tank, wherein the slide bar is connected to the connection bar between the contact end and the hinge end.

3. The backflow prevention water tank of claim 2, wherein a distance between the hinge end and the slide bar is smaller than a distance between the contact end and the slide bar.

4. The backflow prevention water tank of claim 1, further comprising:

a guide pipe extending downward from a second water inlet pipe toward the slide bar sealing element, wherein the second water inlet is formed at an end of the guide pipe; and a sleeve disposed on the slide bar for engagement with the guide pipe, and the slide bar sealing element is disposed inside the sleeve;

wherein the sleeve slides up and down to engage and disengage the guide pipe.

5. The backflow prevention water tank of claim 1, wherein each of the water intake chamber and the first water discharge chamber is substantially ring shaped, the water intake chamber is disposed on an outer side of the first water discharge chamber, and a substantially ring shaped water separating rib is disposed between the water intake chamber and the first water discharge chamber.

6. The backflow prevention water tank of claim 5, wherein the control valve sealing element is disposed above the water intake chamber and the first water discharge chamber, and the control valve water inlet is formed between the water separating rib and the control valve sealing element.

7. The backflow prevention water tank of claim 6, wherein under an action of a water pressure inside the control valve, the control valve sealing element moves downward to engage with the water separating rib to close the control valve water inlet and moves upward to disengage from the water separating rib to open the control valve water inlet.

8. The backflow prevention water tank of claim 1, wherein the control valve sealing element comprises a flexible membrane.

9. The backflow prevention water tank of claim 8, wherein the control valve sealing element comprises a support element disposed above the water intake chamber and the first water discharge chamber, wherein the flexible membrane includes rubber and the flexible membrane is disposed on the support element, and wherein the sealing element through hole is in the support element.

10. The backflow prevention water tank of claim 1, wherein the water tank comprises:

a water tank housing defining the water holding chamber and having a bottom with a water outlet; and a water tank lid coupled on the water tank housing, the water tank lid including the first water inlet and the second water inlet, wherein the control valve is disposed inside the water tank lid and the water tank housing.

11. The backflow prevention water tank of claim 1, further comprising:

a first water discharge pipe in fluid communication with the first water discharge chamber;

a first water inlet pipe in fluid communication with the first water inlet; and a first water supply tube fluidly connecting the first water discharge pipe and the first water inlet pipe.

12. The backflow prevention water tank of claim 11, further comprising:

a second water discharge pipe in fluid communication with the second water discharge chamber;

a second water inlet pipe in fluid communication with the second water inlet, and a second water supply tube fluidly connecting the second discharge pipe with the second water inlet pipe.

13. The backflow prevention water tank of claim 12, wherein that the water tank comprises an overflow port.

14. A backflow prevention system having the backflow prevention water tank of claim 12, wherein the system comprises:

a water pump that is in fluid communication with the water outlet of the water tank; and a pressure stabilization valve that is in fluid communication with the water intake chamber of the control valve.

15. The backflow prevention system of claim 14, further comprising:

a control valve water inlet pipe in fluid communication with the water intake chamber;

a third supply tube fluidly connecting the pressure stabilization valve and control valve water inlet pipe;

a fourth supply tube fluidly connecting the water pump and the water outlet.

16. A backflow prevention system for use with a bathroom apparatus, the backflow prevention system comprising:

a backflow water tank assembly comprising:

a water tank having a water holding chamber, a first water inlet, a second water inlet, and a water outlet;

a control valve in the water tank, the control valve comprising a water intake chamber, a first water discharge chamber in fluid communication with the first water inlet, a second water discharge chamber in fluid communication with the second water inlet, a control valve water inlet that selectively fluidly connects the water intake chamber and the first water discharge chamber, and a through hole that fluidly connects the second water discharge chamber and the water intake chamber;

a control valve sealing element for opening and closing the control valve water inlet;

a water pump that is in fluid communication with the water outlet; and a pressure stabilization valve that is in fluid communication with the water intake chamber of the control valve;

wherein when the second water inlet is in a closed state, the control valve water inlet switches from an open state to a closed state; and wherein when the second water inlet is in an open state, the control valve water inlet switches from the closed state to the open state.

17. The backflow prevention system of claim 16, further comprising:

a guide pipe extending downward from a second water inlet pipe toward a slide bar sealing element, wherein the second water inlet is formed at an end of the guide pipe; and a sleeve disposed on a slide bar for engagement with the guide pipe, and the slide bar sealing element is disposed inside the sleeve;

wherein the sleeve slides up and down to engage and disengage the guide pipe.

18. The backflow prevention system of claim 17, further comprising a water separating rib that is disposed between the water intake chamber and the first water discharge chamber; wherein the control valve sealing element is disposed above the water intake chamber and the first water discharge chamber; wherein the control valve water inlet is formed between the water separating rib and the control valve sealing element; and wherein under an action of a water pressure inside the control valve, the control valve sealing element moves downward to engage with the water separating rib to close the control valve water inlet and moves upward to disengage from the water separating rib to open the control valve water inlet.

19. The backflow prevention system of claim 18, further comprising:

a float in the water holding chamber;

a slide bar in the water holding chamber and in contact with the float, wherein the slide bar moves toward a side of the second water inlet under the action of the float; and a slide bar sealing element disposed on the slide bar for controlling opening and closing of the second water inlet.

20. The backflow prevention system of claim 19, further comprising a connecting bar that is disposed on the slide bar, the connecting bar comprising:

a contact end that is configured to contact the float; and a hinge end pivotally connected to the backflow prevention water tank, wherein the slide bar is connected between the contact end and the hinge end.

* * * * *